(12) United States Patent
Vanacore, Jr.

(10) Patent No.: US 9,032,660 B2
(45) Date of Patent: May 19, 2015

(54) FISHING SYSTEM TO ATTRACT FISH

(76) Inventor: William George Vanacore, Jr., Hahira, GA (US)

(*) Notice: Subject to any disclaimer, the term of this patent is extended or adjusted under 35 U.S.C. 154(b) by 316 days.

(21) Appl. No.: 13/436,574

(22) Filed: Mar. 30, 2012

(65) Prior Publication Data

US 2012/0317864 A1    Dec. 20, 2012

Related U.S. Application Data

(60) Provisional application No. 61/497,801, filed on Jun. 16, 2011, provisional application No. 61/500,745, filed on Jun. 24, 2011.

(51) Int. Cl.
*A01K 85/00*    (2006.01)

(52) U.S. Cl.
CPC ...................... *A01K 85/00* (2013.01)

(58) Field of Classification Search
CPC ....................................................... A01K 85/01
USPC .............................. 43/42.31, 17.1, 26.2, 26.1
See application file for complete search history.

(56) References Cited

U.S. PATENT DOCUMENTS

| | | | |
|---|---|---|---|
| 2,757,475 A | 8/1956 | Pankove | |
| 3,841,012 A | 10/1974 | Maled | |
| 4,223,467 A | 9/1980 | Hodges, Jr. et al. | |
| 4,380,132 A | 4/1983 | Atkinson | |
| 4,420,900 A * | 12/1983 | Nestor | 43/17 |
| 4,602,451 A | 7/1986 | Perez et al. | |
| 4,638,585 A * | 1/1987 | Korte | 43/26.1 |
| 5,001,856 A * | 3/1991 | Gentry | 43/42.31 |
| 5,038,513 A * | 8/1991 | Hardin | 43/42.31 |
| 5,105,573 A | 4/1992 | Mays | |
| 5,485,697 A * | 1/1996 | Watson et al. | 43/42.31 |
| 6,057,753 A | 5/2000 | Myers | |
| 6,108,962 A * | 8/2000 | Barron | 43/42.31 |
| 6,581,319 B2 | 6/2003 | West | |
| 6,665,976 B2 | 12/2003 | West | |
| 6,684,556 B1 | 2/2004 | Arbuckle et al. | |
| 6,789,347 B1 | 9/2004 | West et al. | |
| 6,804,909 B1 | 10/2004 | West | |
| 6,910,294 B1 | 6/2005 | Talbert | |
| 6,978,571 B1 * | 12/2005 | Nemire | 43/42.31 |
| 7,207,135 B1 * | 4/2007 | Williams, Jr. | 43/42.31 |
| 7,325,357 B2 | 2/2008 | Wiskur | |
| 7,383,659 B1 * | 6/2008 | Honkanen | 43/26.2 |
| 7,530,194 B1 | 5/2009 | Wrape | |
| 8,448,375 B1 * | 5/2013 | Blankenship | 43/19.2 |
| 2009/0071057 A1 * | 3/2009 | Hoyt | 43/42.31 |

* cited by examiner

*Primary Examiner* — Rob Swiatek
*Assistant Examiner* — Morgan T Barlow

(57) ABSTRACT

A motion system for fishing lures provides vibration, buzz and hum to a conventional fishing lure or that is integrated to an interior portion of a fishing lure. The motion system enables the lure to give off signals and/or vibrations like a wounded fish may give off, without the fisherperson moving the lure. The motion system of the present invention can work in murky, stained water and at night to help fish locate the lure. The motion system may include a containment system that holds a coin/pancake type vibrator that is connected with a battery, typically a button-type battery.

3 Claims, 3 Drawing Sheets

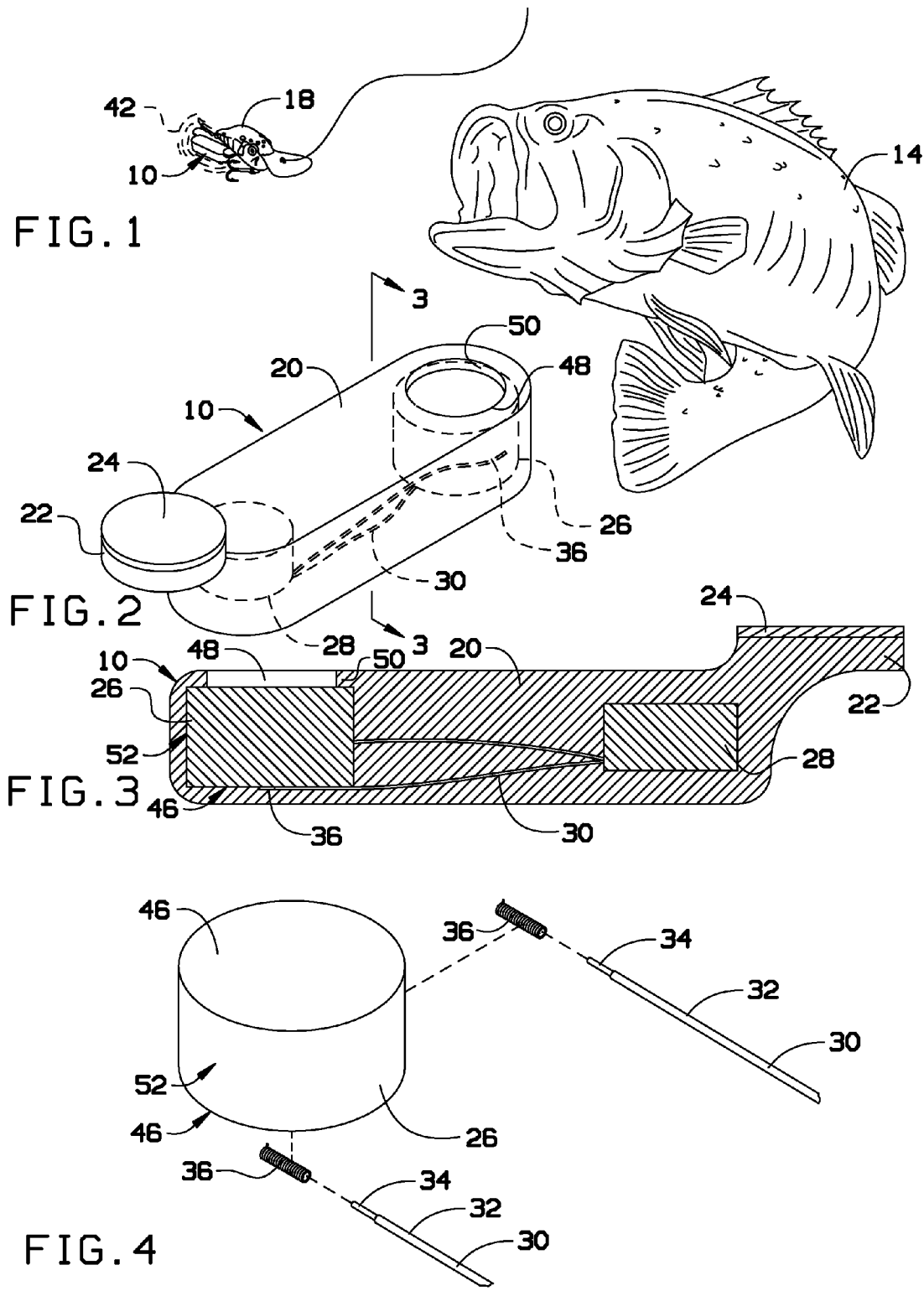

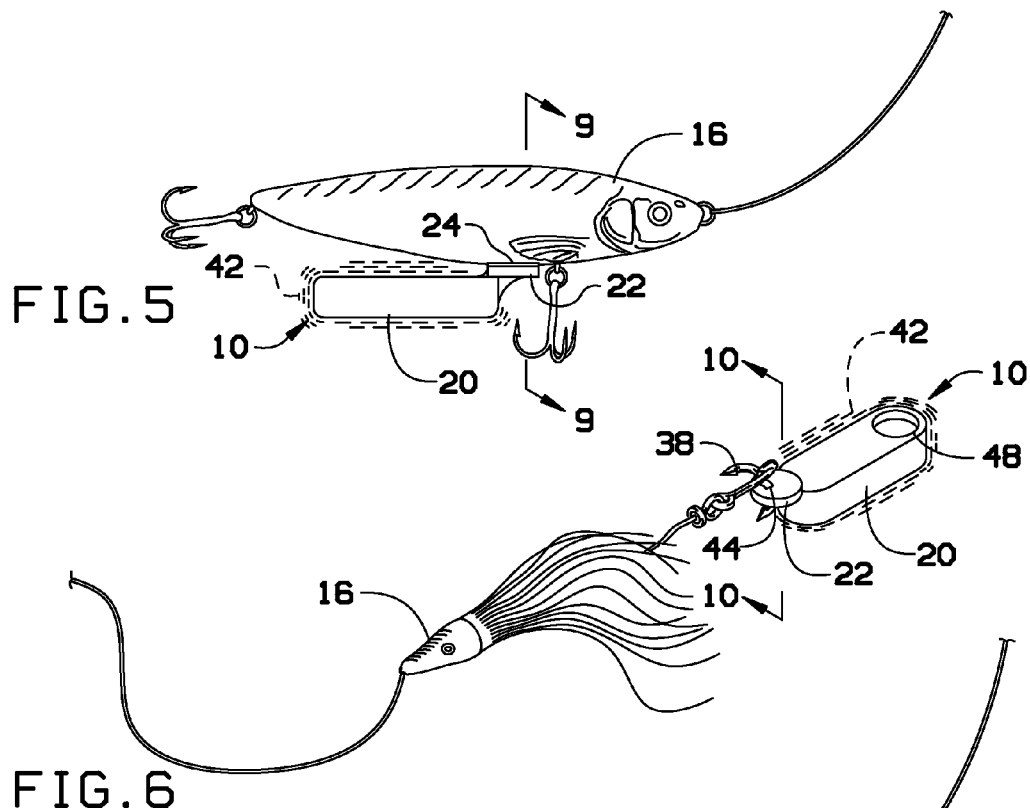
FIG.5
FIG.6
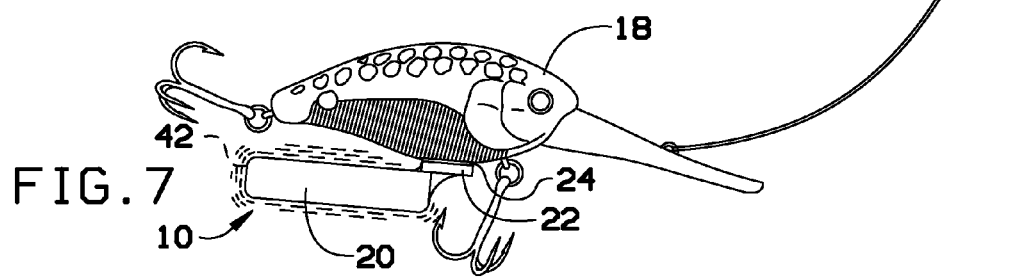
FIG.7
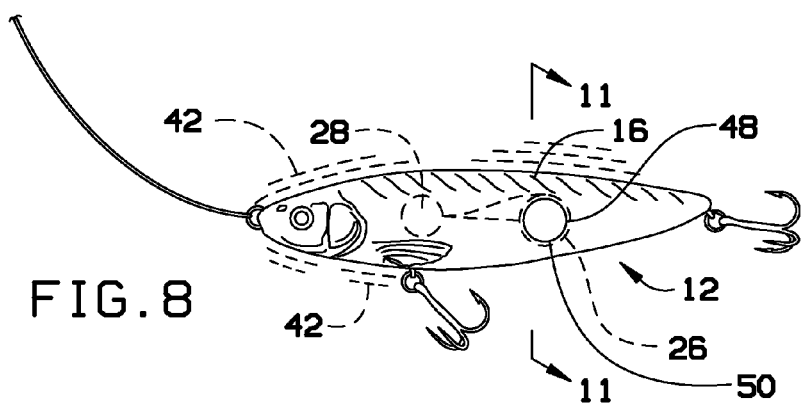
FIG.8

FISHING SYSTEM TO ATTRACT FISH

CROSS-REFERENCE TO RELATED APPLICATIONS

This application claims the benefit of priority of U.S. provisional patent application No. 61/497,801, filed Jun. 16, 2011, and U.S. provisional patent application No. 61/500,745, filed Jun. 24, 2011, the contents of both are herein incorporated by reference.

BACKGROUND OF THE INVENTION

The present invention relates to fishing systems and more particularly, to a fishing system having a vibrator and a battery to attract fish through vibration, buzzing and humming. The vibrator can be installed into or onto any fishing lure.

Fishing lures do not have any noise or motion unless they are being pulled away from the fish.

As can be seen, there is a need for an improved fishing system that can vibrate, buzz and hum.

SUMMARY OF THE INVENTION

In one aspect of the present invention, a device for fishing comprises a containment body; a battery disposed in the containment body; and a vibrator motor electrically connected to the battery.

In another aspect of the present invention, a method for fishing comprises causing at least one of vibration, buzz and hum underwater by turning a small vibrator motor contained in a containment body and powered by a battery, wherein the vibrator motor is disposed proximate to a fishing lure.

These and other features, aspects and advantages of the present invention will become better understood with reference to the following drawings, description and claims.

BRIEF DESCRIPTION OF THE DRAWINGS

FIG. 1 is a perspective view of a fishing lure having a motion system, in use, according to an exemplary embodiment of the present invention;

FIG. 2 is a perspective view of motion system of FIG. 1;

FIG. 3 is a cross-sectional view taken along line 3-3 of FIG. 2;

FIG. 4 is a partial exploded view of the motion system of FIG. 1;

FIG. 5 is a side view of the motion system of the present invention attached to a first style of fishing lure;

FIG. 6 is a side view of the motion system of the present invention attached to a second style of fishing lure;

FIG. 7 is a side view of the motion system of the present invention applied to a third style of fishing lure;

FIG. 8 is a side view of the motion system of the present invention, internal to the first style of fishing lure;

DETAILED DESCRIPTION OF THE INVENTION

Figure 9:
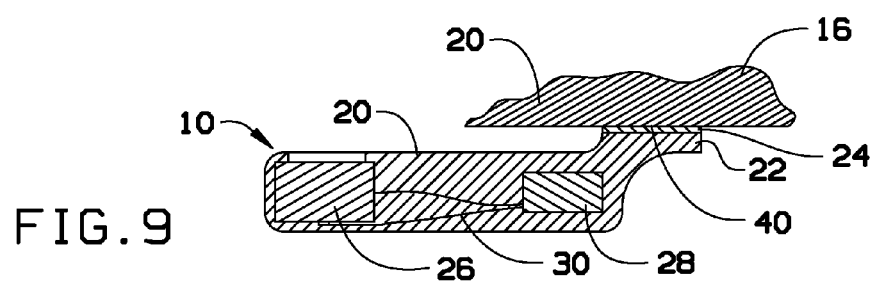
FIG. 9 is a cross-sectional view taken along line 5-5 of FIG. 5.
Figure 10:
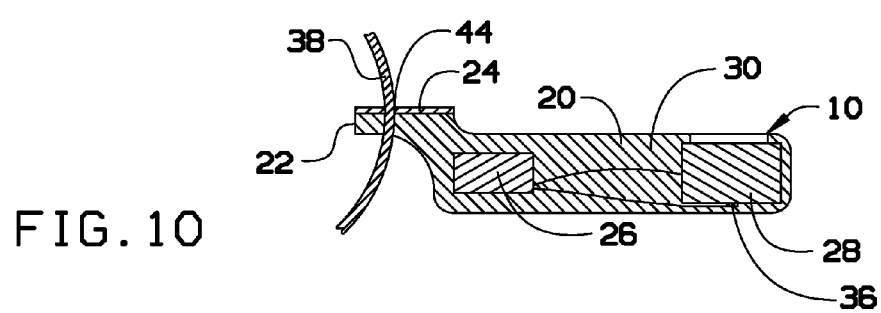
FIG. 10 is a cross-sectional view taken along line 10-10 of FIG. 6.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a motion system for fishing lures that provides vibration, buzz and hum to a conventional fishing lure or that is integrated to an interior portion of a fishing lure. The motion system enables the lure to give off signals and/or vibrations like a wounded fish may give off, without the fisherperson moving the lure. The motion system of the present invention can work in murky, stained water and at night to help fish locate the lure. The motion system may include a containment system that holds a coin/pancake type vibrator that is connected with a battery, typically a button-type battery.

Referring now to FIGS. 1 through 11, a containment body unit assembly 10 (also referred to as a motion system 10) may include a containment body 20 having a containment lip 22 for attaching the assembly 10 to a fishing lure, such as a bass lure 18, which may be used to hook a fish 14. The containment lip 22 may provide a variety of mechanisms to connect the assembly 10 to the lure 18. For example, double sided tape 24 may be applied to one side of the containment lip 22 for attachment to a lure underbody surface 40 of the fishing lure 18. In some embodiments, as shown in FIG. 6, a hook 38 of the lure 16 may pass through a penetration point 44 of the containment lip 22.

A battery 26 may be disposed in a battery insertion hole 48 in the containment body 20. A battery insertion hole retainment lip 50 may hold the battery in the battery insertion hole 48. In some embodiments, the battery may be integral with the containment body 20. In these embodiments, the battery may be a rechargeable battery that may be recharged at a recharging terminal or pad, for example. Wires 30 may run from the battery 26 to a vibrator motor 28 (also referred to as vibrator 28). The wires 30 may have a copper coil 36 at one end 34 thereof to make electrical contact with a battery negative contact surface 46 and a battery positive contact surface 52 of the battery 26. The wires 30 may be coated with a wire sheath 32, for example, or, if made integrally with a non-conducting containment body 20, may be bare wires.

As shown in FIGS. 5 through 7, 9 and 10, the assembly 10 may be attached to a variety of different lures 16, 18 in a variety of different manners. The assembly 10 may be attached to a portion of the lure 16, 18 or may be attached onto one or more hooks of the lure 16.

Figure 11:
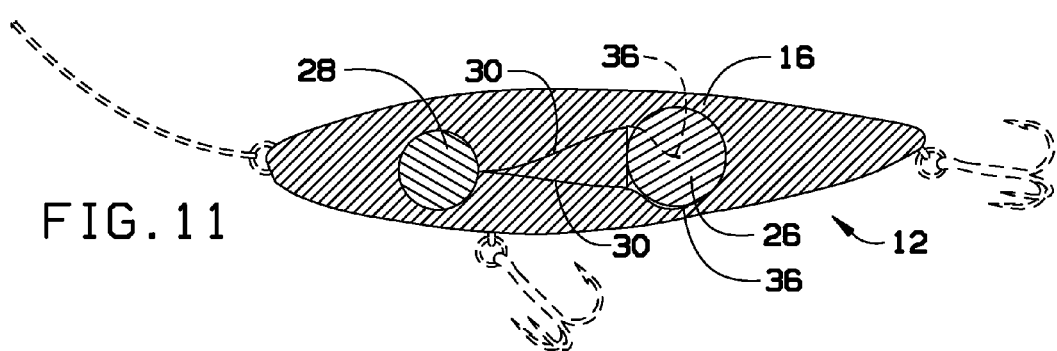
FIG. 11 is a cross-sectional view taken along line 11-11 of FIG. 8.

As shown in FIGS. 8 and 11, a lure 16 may be formed as a non-containment body unit assembly 12, having the vibrator 28 and the battery 26 formed therewithin. In this embodiment, the entire lure itself may vibrate, buzz and/or hum 42 when the unit is activated. The assembly 12 may be disposed inside various types of lures in various configurations.

The wires 30 may be interrupted with a switch (not shown) to turn the vibrator motor 28 on and off as desired while the battery 26 is still disposed in the battery insertion hole 48. Otherwise, a user can turn off the vibrator motor 28 by simply removing the battery 26. The switch may be any variety of switches, such as a push switch disposed along an exterior surface of the assembly 10. For the internal configuration of FIGS. 8 and 11, the switch may be disposed along the surface of the lure 16, for example.

The size and shape of the assembly 10, 12 may vary to suit the needs of the fisherperson and the desired application. Moreover the assembly 10, 12 may be designed to fit on a lure, on a fishing line, on a hook, on a jig, on another accessory, such as on a sinker, or in a lure, in a sinker, or the like. Regardless of the location, the assembly 10, 12 may attract fish through one or more of vibration, buzz and hum 42.

It should be understood, of course, that the foregoing relates to exemplary embodiments of the invention and that modifications may be made without departing from the spirit and scope of the invention as set forth in the following claims.

What is claimed is:

1. A combination fishing lure and containment body assembly, the containment body assembly comprising:
    a containment body having a battery insertion hole therein;
    an electrical vibrator motor contained within the containment body;
    a pair of wires extending from the vibrator motor to the battery insertion hole;
    a battery for powering said vibrator motor, said battery being insertable within the battery insertion hole so as to be in electrical contact with said pair of wires;
    means for retaining the battery within said battery insertion hole; and
    means for attaching said containment body to the exterior of said fishing lure, said containment body being mounted to said fishing lure exterior solely via said means for attaching.

2. The device of claim 1, wherein said means for attaching comprises a containment lip, wherein the containment lip comprises a substantially flat surface.

3. The device of claim 2, wherein the containment lip includes an adhesive for connecting the device adhesively to the fishing lure.

\* \* \* \* \*